(12) United States Patent
Chen

(10) Patent No.: US 6,865,017 B2
(45) Date of Patent: Mar. 8, 2005

(54) OPTICAL FIBER AMPLIFIER WITH ERROR CORRECTION

(75) Inventor: Guansan Chen, Fremont, CA (US)

(73) Assignee: Oplink Communications, Inc., Fremont, CA (US)

(*) Notice: Subject to any disclaimer, the term of this patent is extended or adjusted under 35 U.S.C. 154(b) by 0 days.

(21) Appl. No.: 10/600,414

(22) Filed: Jun. 20, 2003

(65) Prior Publication Data

US 2004/0257643 A1 Dec. 23, 2004

(51) Int. Cl.[7] .................................................. H01S 3/00
(52) U.S. Cl. ................................. 359/337.11; 359/341.4
(58) Field of Search ......................... 359/337.11, 341.4, 359/341.41

(56) References Cited

U.S. PATENT DOCUMENTS 5,923,462 A * 7/1999 van der Plaats ......... 359/341.3
6,359,726 B1 * 3/2002 Onaka et al. ............ 359/337.1

* cited by examiner

*Primary Examiner*—Mark Hellner
(74) *Attorney, Agent, or Firm*—Fish & Richardson P.C.

(57) ABSTRACT

Methods and apparatus for amplifying a signal are provided. In one aspect, a method is provided for amplifying an optical signal using an EDFA and includes amplifying an input signal using an EDFA producing an amplified output signal; measuring a pump residual power component of the amplified output signal, and using the measured pump residual power component to adjust a performance of the EDFA.

22 Claims, 3 Drawing Sheets

OPTICAL FIBER AMPLIFIER WITH ERROR CORRECTION

The present invention relates generally to optical technology.

BACKGROUND OF THE INVENTION

Optical fiber amplifiers are commonly used in communication systems. Examples of optical fiber amplifiers include Erbium Doped Fiber Amplifiers ("EDFA") and other type of Rare Earth Doped Fiber Amplifiers. The optical fiber amplifiers are usually pumped by one or more light emitter diodes (LEDs) or lasers. FIG. 1 illustrates a configuration for an EDFA 100 that is optically pumped by a light source, such as, a laser.

FIG. 1 illustrates a forward pumping scheme. With a forward pumping scheme, the optical signal to be amplified and the pumping light travel in a same direction. A first pump light Pl received from pump laser 102 is transmitted to a wave division multiplexing (WDM) coupler 108 as pumping light. An input optical signal Si, after passing through a tap 104 and an isolator 106 is coupled to WDM coupler 108. WDM coupler 108 combines the input optical signal Si and the pumping light Pl and provides an output to EDFA 100. Input optical signal Si is amplified in EDFA 100, and becomes output light So. Output light So is coupled to a tap 112 whose primary output is an amplified version of the input signal Si. The tap ports of tap 104 and tap 112 are coupled to detectors 110 and 114 whose outputs are coupled to a feedback circuit, e.g., PCB 120. Using the input power measured at detector 110 and the output power as detected at detector 114, the gain for EDFA 100 can be adjusted.

In the example shown in FIG. 1, two photodiodes (detectors 110 and 114) at respective input and output ports of EDFA 100 are used to detect input power Pin and output power Pout, respectively. The gain of EDFA 100 can be controlled by the pump power associated with the pumping light P1. More specifically, detector 110 measures the total input power Pin associated with the signal Si provided to the EDFA. Detector 114 detects the total output power Ptol of EDFA 100, which contains signal power Ps, amplified spontaneous emission (ASE) power Pase and pump residual power Ppr. In this example, signal gain is Pout/Pin=(Ptol−Pase−Ppr)/Pin. Conventional systems assume a correction factor for ASE power and pump residual power in order to produce accurate gain control, for example, in systems that require constant gain. If the wavelength of input signal is known, the correction factor can be determined accurately, thus the gain control is accurate. But if the wavelength of input signal is unknown, there exist problems in certain applications. More specifically different wavelength signals produce different ASE power and pump residual power for a given gain setting. When EDFA 100 is used in applications such as line-amplifiers and boosters, the output signal power, in general, is much larger than the ASE power and pump residual power. Accordingly, a near constant correction factor can be used to provide accurate gain control. But for EDFA applications such as preamplifiers with small input power (for example: −38 dBm) and smaller output power (for example: −14 dBm), the ASE power at the output port of the EDFA is larger than the output signal power. In these applications, the use of a constant correction factor will not produce accurate gain control. Further, the amount of pump residual signal Ppr depends on numerous factors including the power of the input signal, the wavelength of the input signal, and the performance of the amplifier and the WDM splitters. Again, a constant correction factor will not produce accurate gain control as the EDFA is used in different applications. What is desirable is an amplifier that automatically compensates for the pump residual and ASE in the output signal no matter the application.

SUMMARY OF THE INVENTION

In one aspect, the invention provides an integrated optical fiber amplification system. The integrated optical fiber amplification system includes an optical amplifier comprising an optical signal input for receiving an input optical signal to be amplified; a pumping laser input for receiving a pumping laser input signal for use in amplifying the input optical signal; means for measuring a power of the pumping laser input signal; a combiner for combining the pumping laser input signal and the input optical signal; an EDFA having an input coupled to the output of the combiner and an output coupled to a splitter, the splitter dividing out a portion of the signal output from the EDFA and attributable to a pump residual power of the pumping laser after amplification by the EDFA; means for measuring the pump residual power; and feedback means for adjusting a current of the pumping laser using the residual power and the pumping laser input signal power.

Aspects of the invention can include one or more of the following features. The optical amplifier can comprise a pumping laser having a first frequency and coupled to the pumping laser input. The means for measuring a power can be a photodiode. The optical amplifier can further comprise a gain flattening filter coupled to an output of the splitter for receiving and filtering a remainder signal attributable to an amplified input signal received from the splitter and providing a flattened output signal. The optical amplifier can further comprise a variable optical attenuator coupled to the output of the gain-flattening filter (GFF) for variably adjusting a received signal to achieve constant power output. The combiner can be a wave division multiplexing (WDM) combiner. The WDM combiner can combine an input signal of substantially 1550 NM with a pumping laser input of substantially 980 NM. The splitter can be a wave division multiplexing (WDM) splitter. The WDM splitter can split an output of the EDFA into a first signal having a first frequency and a second signal having a second frequency, where the first signal has a frequency that is substantially 1550 NM and the second frequency is substantially 980 NM. The WDM splitter can split an output of the EDFA into a first signal having a first frequency and associated with an amplified version of the input signal and a second signal having a second frequency and associated with the pumping laser signal.

In another aspect, an optical amplifier is provided that includes an optical signal input for receiving an input optical signal to be amplified; a pumping source input for receiving a pumping source input signal for use in amplifying the input optical signal; a combiner for combining the pumping source input signal and the input optical signal; an EDFA having an input coupled to the output of the combiner and an output coupled to a splitter, the splitter dividing out a portion of the signal output from the EDFA and attributable to a pump residual of the pumping laser after amplification by the EDFA; and error correction means for measuring the pump residual and adjusting the pumping input signal provided by the pumping source.

Aspects of the invention can include one or more of the following advantages. The optical amplifier can comprise a pumping laser having a first frequency and coupled to the pumping source input. The error correction means can include a photodiode for measuring a power of a pump residual. A gain flattening filter (GFF) can be coupled to an output of the splitter for receiving and filtering a remainder signal attributable to an amplified input signal received from the splitter and providing a flattened output signal. The optical amplifier can further comprise a variable optical attenuator coupled to the output of the GFF for variably adjusting a received signal to achieve constant power output. The combiner can be a wave division multiplexing (WDM) combiner. The WDM combiner can combine an input signal of substantially 1550 NM with a pumping source input of substantially 980 NM. The splitter can be a wave division multiplexing (WDM) splitter. The WDM splitter can split an output of the EDFA into a first signal having a first frequency and a second signal having a second frequency, where the first signal can have a frequency that is substantially 1550 NM and the second frequency can be substantially 980 NM. The WDM splitter can split an output of the EDFA into a first signal having a first frequency and associated with an amplified version of the input signal and a second signal having a second frequency and associated with the pumping source signal.

In another aspect, an optical amplifier is provided including an optical signal input for receiving an input optical signal to be amplified; a pumping source input for receiving a pumping source input signal for use in amplifying the input optical signal; an EDFA operable to use the pumping source input signal to amplify the input optical signal producing an output optical signal; and an error correction controller for measuring the pump residual and adjusting the pumping input signal provided by the pumping source.

In another aspect, a method is provided for amplifying an optical signal using an EDFA and includes amplifying an input signal using an EDFA producing an amplified output signal; measuring a pump residual power component of the amplified output signal, and using the measured pump residual power component to adjust a performance of the EDFA.

Aspects of the invention can include one or more of the following advantages. An integrated optical fiber amplification system is provided that automatically compensates for pump residual power when determining gain. The proposed amplification system can automatically compensate for the error introduced due to the pump residual. The proposed amplification system can be used for constant gain applications without requiring reconfiguration to compensate for errors. The proposed amplification system can automatically compensate for error correction introduced when signal inputs of different levels are amplified.

In an implementation using an EDFA, the invention can include one or more of the following advantages. By keep-ing the ratio of pump residual to injected pump power in the amplifier cavity constant, the spectral gain profile of the EDFA is conserved notwithstanding the input-channel distribution injected in the EDFA. Accuracy of gain control only depends on output spectral profile of the EDFA, and can be 1 dB of flatness without care of the wavelength and power of the input signal. The detected parameters in the implementation shown are input power, pump power and pump residual power. These parameters are independent of the ASE and can be detected accurately. The gain control accuracy only depends on the flatness of the output optical spectrum because the ratio only depends on the flatness. Accordingly, the effect of ASE on gain control accuracy can be eliminated. Other advantages will be readily apparent from the attached figures and the description below.

DETAILED DESCRIPTION OF THE INVENTION

The present invention relates to an improvement in optical technology. The following description is presented to enable one of ordinary skill in the art to make and use the invention and is provided in the context of a patent application and its requirements. Various modifications to the invention will be readily apparent to those skilled in the art and the generic principals herein may be applied to other embodiments. Thus, the present invention is not intended to be limited to the embodiments shown, but is to be accorded the widest scope consistent with the principals and features described herein.

The present invention will be described in terms of an integrated amplifier having specific components having specific configurations. Similarly, the present invention will be described in terms of components having specific relationships, such as interconnections between components. However, one of ordinary skill in the art will readily recognize that the devices and systems described can include other components having similar properties, other configurations, and other relationships between components.

Figure 1:
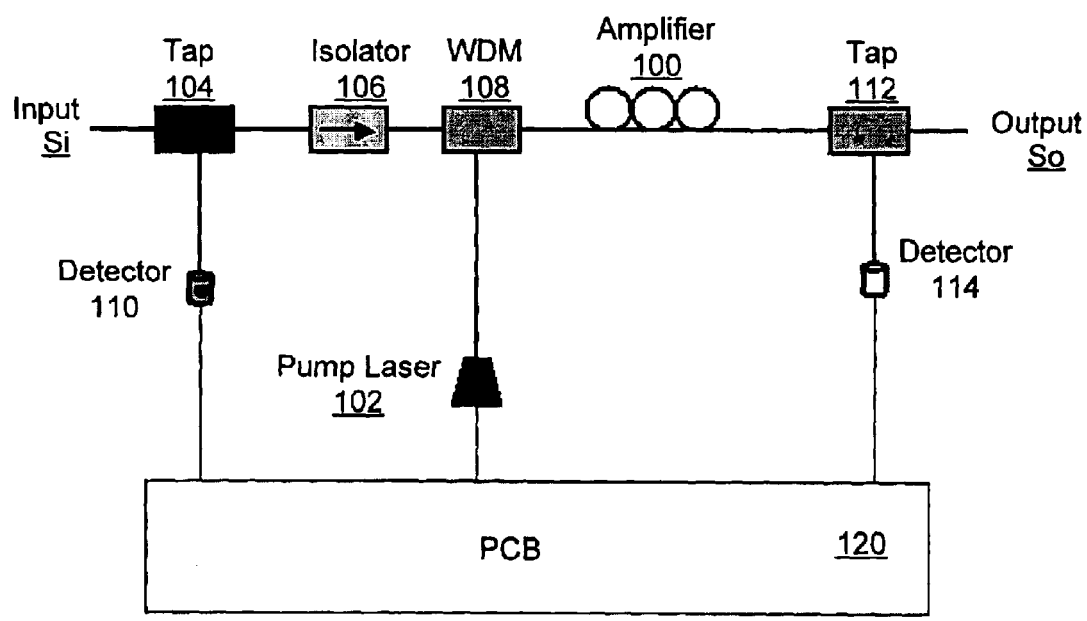
FIG. 1 illustrates an Erbium Doped Fiber Amplifier.
Figure 2:
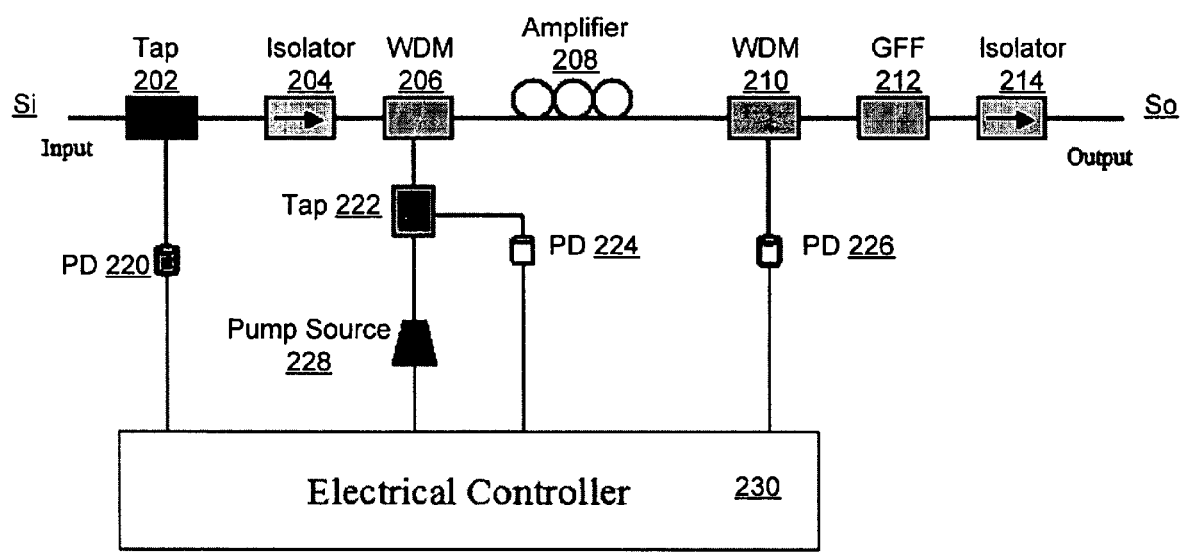
FIG. 2 illustrates an integrated amplification system for an optical signal.

FIG. 2 illustrates an integrated amplification system 200 for optical signals. The integrated amplification system shown is configured for a forward pumping application. The integrated amplification system includes isolators 204 and 214, wave division multiplexers (WDM) 206 and 210, amplifier 208 and pump source 228. In addition, various monitoring and control components are provided including photo detectors 220, 224, and 226, taps 202 and 222 and electrical controller 230. In the implementation shown, a gain flattening filter 212 is provided as well. The operation of the gain flattening filter 212 is described in greater detail below.

Integrated amplification system 200 includes a first port for receiving an input signal Si and a second port for providing an output signal So. The input signal is provided as an input to tap 202. In one implementation, tap 202 is a 1550 nm tap that includes a primary output and a tap output. The primary output of tap 202 is coupled to an input of isolator 204. The tap output from tap 202 is provided as an input to photo detector 220, whose output is provided as an input to electrical controller 230. Photo detector 220 can be a photodiode and measures the input power of input signal Si.

The output of isolator 204 is coupled to an input of WDM 206, whose second input is provided by pump source 228. Pump source 228 can be a pump laser, a light emitting diode or other source. Pump source 228 receives a control signal from electrical controller 230 for varying the performance of the pump source. The control signal can be a signal for increasing or decreasing the pump current. The output of pump source 228 is provided as an input to tap 222. The primary output of tap 222 is coupled to the second input of WDM 206. The tap output from tap 222 is provided as an input to photo detector 224, whose output is provided as an input to electrical controller 230. Photo detector 224 can be a photodiode and measures the injected pumping signal power.

WDM 206 is a combiner and operates to combine the input signal Si and the injected pumping signal provided from the pumping source 228 and provides an output signal to amplifier 208. In one implementation, WDM 206 combines an input signal, at for example 1550 nm, with an injected pumping signal, at for example 980 nm. Amplifier 208 can be an EDFA.

The output from amplifier 208 is provided as an input to WDM 210. WDM 210 is configured to isolate the pump residual signal from the amplified output signal (and any noise, i.e., ASE) and includes two output ports. In one example, WDM 210 splits the signal received from amplifier 208 into two components, for example, a first component at 980 nm reflecting the pump residual signal and a second component at 1550 nm reflecting the amplified output signal and a noise component (ASE). The first output port of WDM 210 (the residual output) is coupled to an input of photo detector 226, whose output is provided as an input to electrical controller 230. Photo detector 226 can be a photodiode and measures the pump residual power of the pumping signal after use by amplifier 208. In the implementation shown, no direct measurement is made of the output power of the amplified signal So.

The second output of WDM 210 provides an amplified signal with ASE (but without residual pumping power) to an isolator 214. The output of isolator 214 is coupled to a second port of the amplification system 200 providing an output signal So. In the implementation shown, one output of WDM 210 is coupled to an input of a gain-flattening filter 212, whose output is in turn coupled to an input of isolator 214. The gain flattening filter 212 can be used in implementations that require a particular degree of flatness in the performance of the amplification system, for example within 1 db of flatness over a given spectrum.

Operation

An input signal Si is provided as an input to tap 202. Tap 202 taps off a small portion of the input signal to allow for the measurement of the input power of the input signal. The remainder of the signal is provided as an input to isolator 204. Isolator 204 prevents signals from flowing back out the input port. The input signal is provided from the output of the isolator 204 as an input to WDM 206 where it is combined with the injected pumping signal from pump source 228. The injected pumping signal provided by pump source 228 is measured using tap 222 and photo detector 224 and provided as an input to electrical controller 230. The combined injected pumping and input signals are provided to amplifier 208 whose output produces an amplified signal having two components, an amplified version of the input signal (and ASE) and a pump residual signal. The pump residual signal is taped off using WDM 210 and measured using photo detector 226. The amplified version of the input signal (and ASE) is isolated by isolator 214 (providing isolation from signals entering the output port) and provided as an output signal So. Electrical controller 230 can be used to adjust the performance of the pumping source in accordance with the data derived from measurements associated with the input power, the injected pumping power and the pump residual power.

Feedback Operation

Figure 3:
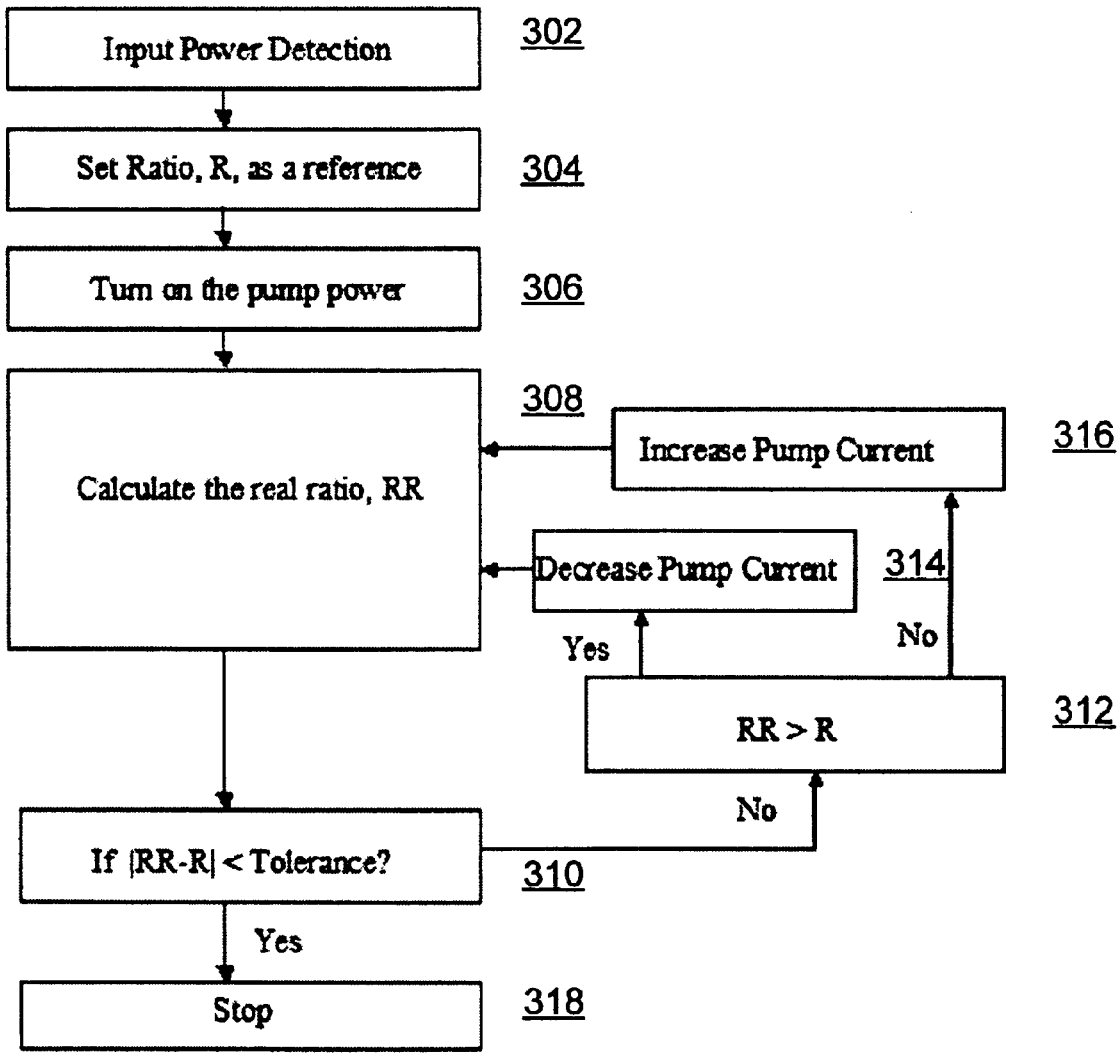
FIG. 3 illustrates a flow chart for an operation of the electrical controller of the integrated amplification system of FIG. 2.

Referring to FIGS. 2 and 3, a method 300 is shown for adjusting the pumping source using one implementation of the invention.

In step 302, the input power of the input signal is detected, for example using photo detector 220. In step 304, a ratio R is defined of the residual pump power and the injected pumping power of the pumping signal for a given application. The ratio R is a design feature typically associated with the performance of a given EDFA. In this way, the ratio R can be seen as an expected ratio that reflects the designed performance of the amplifier. When an EDFA is designed and built, the ratio R has been assumed. In general, a fitting linear equation can be used to calculate the ratio when different input power is considered. Calibration may be required to fit the linear equation. In one implementation, R is a design parameter for special gain. For example, when an EDFA's gain is designed as G (the gain desired), the ratio of residue power to initial pumping power should be R, which is set as a reference. As will be discussed below, if the measured real ratio RR is not equal to R (or within a tolerance), the pump power will be adjusted until the measured ratio is within the tolerance.

In step 306, the power for the pumping source (i.e., pumping source 228) is turned on. In step 308, the real ratio of the injected pumping power Pp and the pump residual Ppr is measured. In the example shown, a measurement is made using photo detectors 224 and 226 of the injected pumping power Pp and the pump residual Ppr, respectively. The real ratio RR of pump residual to injected pump power is RR=Ppr/Pp.

In step 310, a check is made to determine if the difference of the real ratio RR and the ratio R is less than a tolerance value (e.g., using a absolute value of the difference and a positive variable for the tolerance amount). If not, the process proceeds to step 312. If the difference in step 310 is less than the tolerance level, then the process ends at step 318. The tolerance level can be preset and stored in the electrical controller 230.

If the difference is not less than the tolerance, the process continues at step 312 where a check is made to determine which is greater, the ratio R or the real ratio RR. If the real ratio is greater than the ratio R, then the process continues at step 314 where the pump source current is decreased (e.g., electrical controller 230 adjusts or sends a control signal to the pumping source 228 to decrease the pumping current). Alternatively, if the real ratio is less than the ratio R, then the process continues at step 316 where the pump source current is increased (e.g., electrical controller 230 adjusts or sends a control signal to the pumping source 228 to increase the pumping current). After each of steps 314 and 316, control passes to step 308 where the real ratio RR is again determined based on the new pumping conditions.

A method and system has been disclosed for providing an integrated amplification system. Although the present invention has been described in accordance with the embodiments shown, one of ordinary skill in the art will readily recognize that there could be variations to the embodiments and those variations would be within the spirit and scope of the present invention. For example, for an Erbium Doped Fiber Amplifier EDFA, the input optical signal can have a wavelength of 1550 nm, and the pump light can have a wavelength of 980 nm. The pump light signal can also have a wavelength of 1480 nm or a few other wavelengths. Though only a forward pumping implementation is shown, the invention has applicability to backward pumping applications. In the backward pumping applications, the pump residual is isolated from the amplified signal and used in adjusting the performance of the amplification system. Accordingly, many modifications may be made by one of ordinary skill in the art without departing from the spirit and scope of the appended claims.

What is claimed is:

1. An optical amplifier comprising:
   an optical signal input for receiving an input optical signal to be amplified;
   means for measuring a power of the input optical signal;
   a pumping laser input for receiving a pumping laser input signal for use in amplifying the input optical signal;
   means for measuring a power of the pumping laser input signal;
   a combiner for combining the pumping laser input signal and the input optical signal;
   an EDFA having an input coupled to the output of the combiner and an output coupled to a splitter, the splitter dividing out a portion of the signal output from the EDFA and attributable to a pump residual power of the pumping laser after amplification by the EDFA;
   means for measuring the pump residual power; and
   feedback means for calculating an expected ratio of the pump residual power and the pumping laser input power using data including the power of the input optical signal, determining an actual ratio of the pump residual power and pumping laser input power, and adjusting a current of the pumping laser by comparing the expected ratio with the actual ratio.

2. The optical amplifier of claim 1 further comprising a pumping laser having a first frequency and coupled to the pumping laser input.

3. The optical amplifier of claim 1 wherein the means for measuring a power is a photodiode.

4. The optical amplifier of claim 1 further comprising a gain flattening filter (GFF) coupled to an output of the splitter for receiving and filtering a remainder signal attributable to an amplified input signal received from the splitter and providing a flattened output signal.

5. The optical amplifier of claim 4 further comprising a variable optical attentuator coupled to the output of the GFF for variably adjusting a received signal to achieve constant power output.

6. The optical amplifier of claim 1 wherein the combiner is a wave division multiplexing (WDM) combiner.

7. The optical amplifier of claim 6 wherein the WDM combiner combines an input signal of substantially 1550 NM with a pumping laser input of substantially 980 NM.

8. The optical amplifier of claim 1 wherein the splitter is a wave division multiplexing (WDM) splitter.

9. The optical amplifier of claim 1 wherein the WDM splitter splits an output of the EDFA into a first signal having a first frequency and a second signal having a second frequency, where the first signal has a frequency that is substantially 1550 NM and the second frequency is substantially 980 NM.

10. The optical amplifier of claim 1 wherein the WDM splitter splits an output of the EDFA into a first signal having a first frequency and associated with an amplified version of the input signal and a second signal having a second frequency and associated with the pumping laser signal.

11. An optical amplifier comprising:
    an optical signal input for receiving an input optical signal to be amplified;
    a pumping source input of receiving a pumping source input signal for use in amplifying the input optical signal;
    a combiner for combining the pumping source input signal and the input optical signal;
    an EDFA having an input coupled to the output of the combiner and an output coupled to a splitter, the splitter dividing out a portion of the signal output from the EDFA and attributable to a pump residual of the pumping laser after amplification by the EDFA;
    error correction means for calculating an expected ratio of the pump residual, and the pumping source input signal using data including a power of the input optical signal, determining an actual ratio of the pump residual and the pumping source input signal, and adjusting the pumping input signal provided by the pumping source by comparing the expected ratio with the actual ratio.

12. The optical amplifier of claim 11 further comprising a pumping laser having a first frequency and coupled to the pumping source input.

13. The optical amplifier of claim 11 wherein the error correction means includes a photodiode for measuring a power of a pump residual.

14. The optical amplifier of claim 11 further comprising a gain flattening filter (GFF) coupled to an output of the splitter for receiving and filtering a remainder signal attributable to an amplified input signal received from the splitter and providing a flattened output signal.

15. The optical amplifier of claim 14 further comprising a variable optical attentuator coupled to an output of the GFF for variably adjusting a received signal to achieve constant power output.

16. The optical amplifier of claim 11 wherein the combiner is a wave division multiplexing (WDM) combiner.

17. The optical amplifier of claim 16 wherein the WDM combiner combines an input signal of substantially 1550 NM with a pumping source input of substantially 980 NM.

18. The optical amplifier of claim 11 wherein the splitter is a wave division multiplexing (WDM) splitter.

19. The optical amplifier of claim 11 wherein the WDM splitter splits an output of the EDFA into a first signal having a first frequency and a second signal having a second frequency, where the first signal has a frequency that is substantially 1550 NM and the second frequency is substantially 980 NM.

20. The optical amplifier of claim 11 wherein the WDM splitter splits an output of the EDFA into a first signal having a first frequency and associated with an amplified version of the input signal and a second signal having a second frequency and associated with the pumping source signal.

21. An optical amplifier comprising:
- an optical signal input for receiving an input optical signal to be amplified;
- a pumping source input for receiving a pumping source input signal for use in amplifying the input optical signal; and
- an EDFA operable to use the pumping source input signal to amplify the input optical signal producing an output optical signal; and
- an error correction controller for calculating an expected ratio of a pump residual and the pumping source input signal using data including a power of the input optical signal, determining an actual ratio of the pump residual and the pumping source input signal, and adjusting the pumping input signal provided by the pumping source by comparing the expected ratio with the actual ratio.

22. A method for amplifying an optical signal using an EDFA, comprising:
- measuring an input optical signal;
- amplifying the input optical signal using an EDFA producing an amplified output optical signal;
- measuring a pump residual power component of the amplified output optical signal;
- measuring a pump input power; and
- adjusting a performance of the EDFA by calculating an expected ratio of the pump residual power and the pump input power, determining a real ratio of the pump residual power and the pump input power, and comparing the expected ratio with the actual ratio.

* * * * *